March 29, 1960
A. W. MANN ET AL
2,930,127
ARTICULATOR WITH MEANS TO ESTABLISH MANDIBULAR FUNCTIONAL OCCLUSAL PLANE
Filed Oct. 21, 1958
3 Sheets-Sheet 1
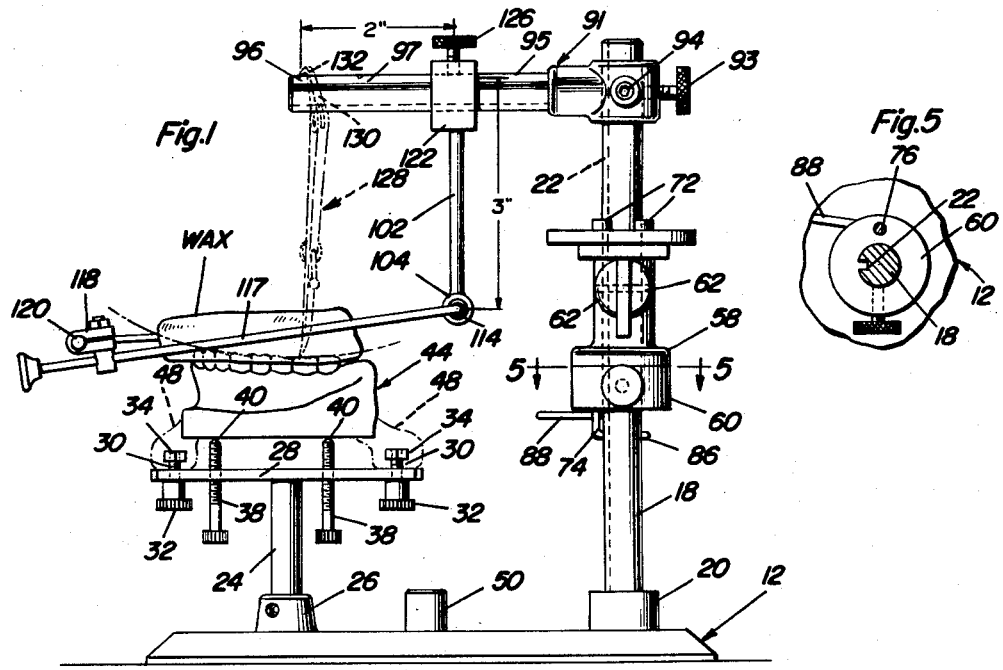
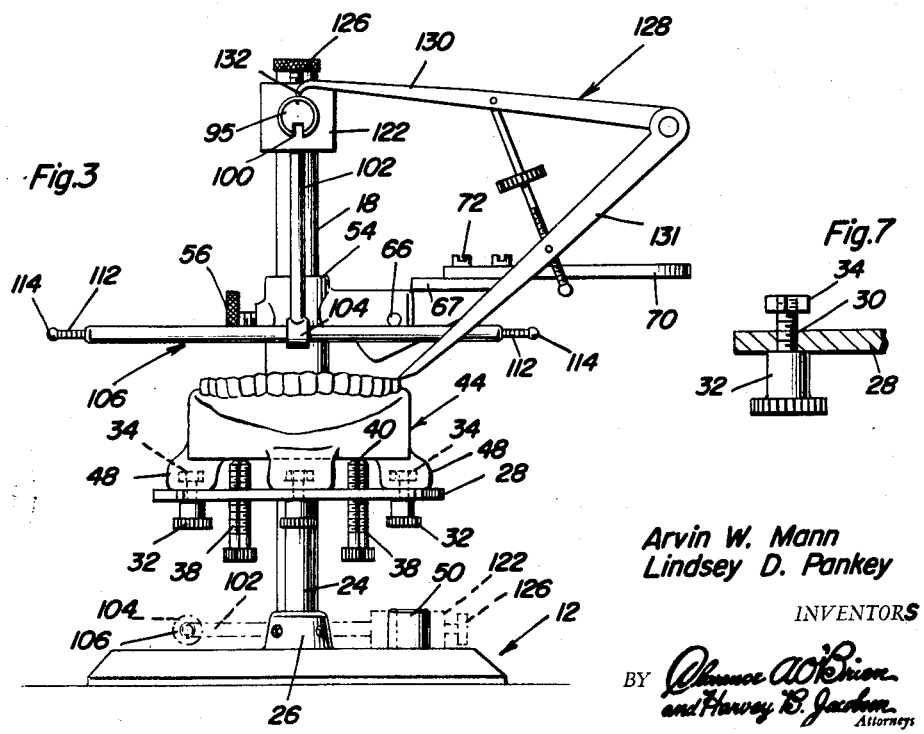
Arvin W. Mann
Lindsey D. Pankey
INVENTORS

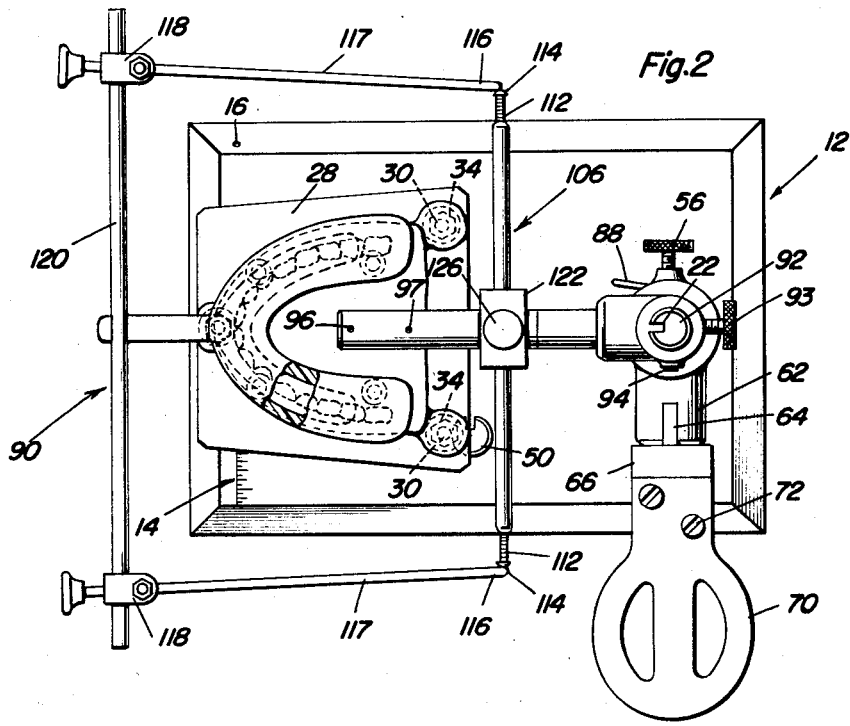
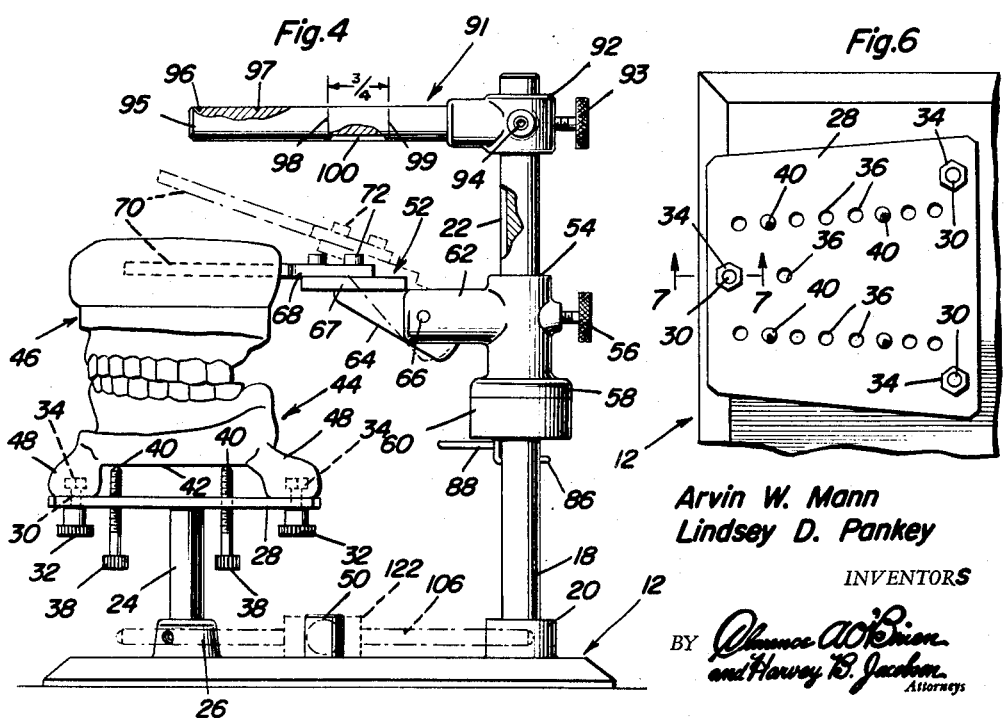

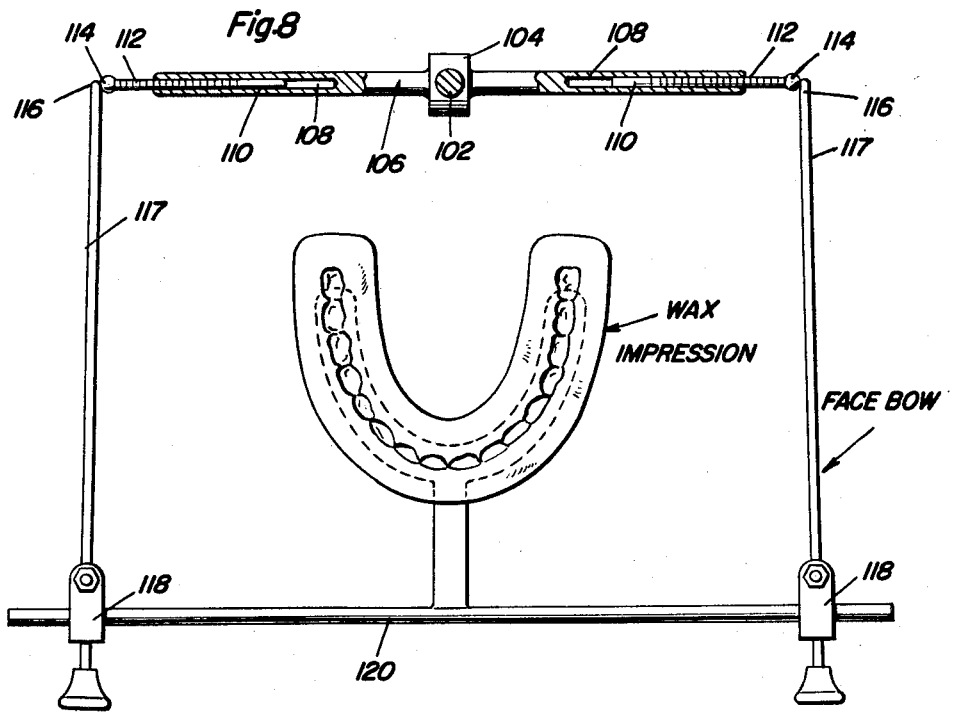
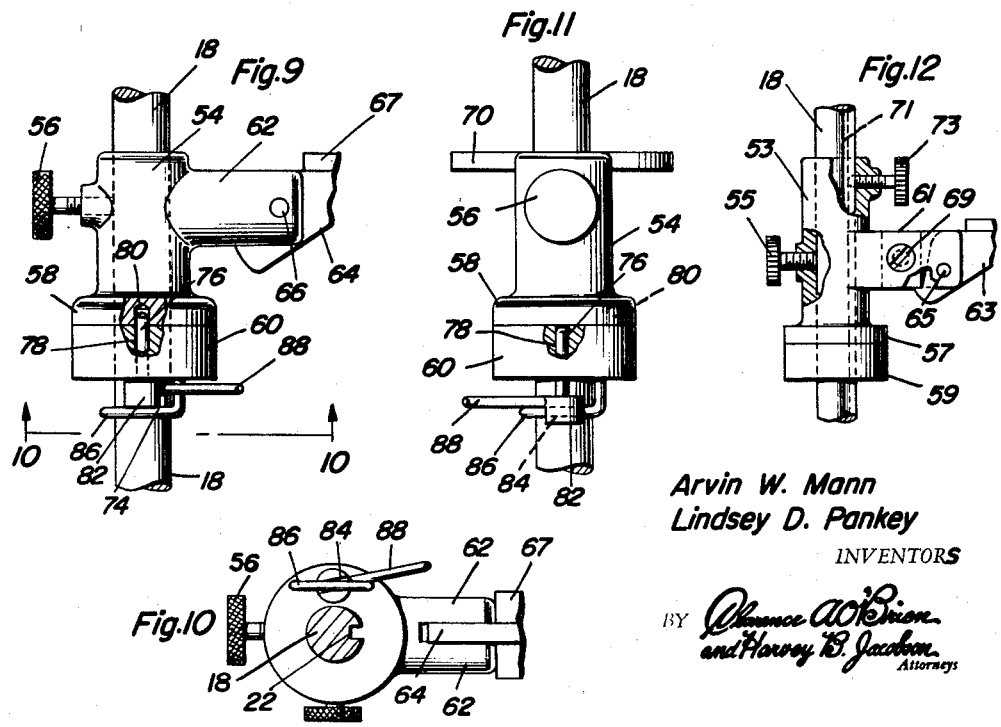
Arvin W. Mann
Lindsey D. Pankey
INVENTORS

2,930,127

ARTICULATOR WITH MEANS TO ESTABLISH MANDIBULAR FUNCTIONAL OCCLUSAL PLANE

Arvin W. Mann, Fort Lauderdale, and Lindsey D. Pankey, Coral Gables, Fla.

Application October 21, 1958, Serial No. 768,775

12 Claims. (Cl. 32—32)

This invention relates to certain new and useful improvements in a dental instrument expressly adapted for use in restorative dentistry, particularly oral rehabilitation, and has reference, more in particular, to a combination as well as a convertible instrument which is constructed in a manner to function on the one hand as an improved articulator, but on the other hand to determine the occlusal plane on the lower model, to study and plan tooth preparations of lower and upper arches, and to orient the relationship of both arches in centric position with maximum esthetics and conservation of tooth structure, being also used to establish and carve the occlusal plane in the wax patterns and to check the finished restorations.

No effort will be made here to comprehend the state of the prior art having to do, broadly speaking, with the many different types of instruments and appliances, articulators for example. However, it seems appropriate at the outset to mention that in order to obtain the relationship of upper and lower casts to articulator components, a facebow is a required instrumentality and that obtaining the relationship of casts with each other usually necessitates the use of bite plates or bite impressions. If the teeth of the casts are not correctly related to the condyles of an articulator when mounted on the same they will not correspond to the relationship existing between the natural teeth and the condyles in terminal hinge position in a given patient's head. Therefore, the eccentric jaw movements simulated by the teeth on the casts of the articulator will be dissimilar to those made by the movement of the patient's jaw during articulation of the natural teeth. In this connection it seems advisable to note and keep in mind that the plane passing through the articulating surfaces of the teeth of both jaws when they are in centric position will be hereinafter designated and referred to as the plane of occlusion.

Articulators, facebows and the many complemental attachments, which come in for consideration herein, are of varying types and forms. Despite the fact that a facebow and the information obtainable from the impression thereon is a matter of critical importance, satisfactory appraisal of the information that ought to be properly conveyed with the aid of the facebow is short of the needs therefor by reason of the fact that existing facilities, that is, on available articulators, do not provide for proper orientation and relating of the legs of the facebow frame therewith. Since compatibility between the interrelation of the facebow and limited accommodations therefor on the articulator seems so inadequate it is an objective in the instant concept of to more effectually coordinate and unite the facilities of an improved articulator and facebow, respectively.

As mentioned, ordinary articulators are adapted so as to support oppositely positioned casts of the human dentition. They are also constructed so that opening and closing (occlusion) movements of the human jaws can be approximated by the mounted casts. One objective of our instrument (not merely an articulator as such but an articulator with special added functional bite facilities) is to provide a convertible combination instrument on which casts can be mounted in such a way as to produce an ideal functional occlusal plane of all mandibular posterior teeth both in the study and working casts. An ideal functional occlusal plane is established first on the lower study or experimental cast. After tooth preparation and impressions, the resulting working cast is mounted in a similar position on the instrument, wax patterns can be fabricated using the instrument, the positional relationships checked after casting with the finished gold casting and the exact functional occlusal plane established in gold on the finished restoration. Restorations made on this new kind of an instrument can then be cemented to place in the mouth and the upper premature contacts in centric and eccentric occlusion removed so that the patient will have an ideal functional occlusal plane.

Considered somewhat in the same sphere of thinking the instant matter has to do with an articulator which is in and of itself of novel instrument and which is equipped with novel means functioning to facilitate oral reconstruction and rehabilitation and through the medium of which a user may determine the functional occlusal plane on the lower study cast in a manner to analyze and plan tooth preparation and to orient the relationship of both arches in centric relation taking into account maximum esthetics and conservation of tooth structure.

Another aspect of the concept which has resulted in reducing the same to practice prompts us, at this point to direct attention to the fact that the invention characterized by added and appropriate facilities provides a precision-type instrument which is unique because it is thought to be the only one that enables a dentist to separate oral rehabilitation into two separate procedures.

It is to be borne in mind however that the instrument is used primarily for reconstruction of the lower posterior teeth. When this particular step has been taken care of the patient may be allowed to rest or return at a later date for construction of the remainder of the oral rehabilitation. In this connection standard procedures, using common or well-known instrumentalities, oral rehabilitation usually requires both upper and lower teeth to be prepared and both dental arches restored on one instrument at the same time. By arranging the patient's program ahead, that is, the steps singly, oral rehabilitation for both the dentist and the patient is not only simplified but more patients may be served by each dentist assuring them at the same time optimum health, comfort and appearance.

As having a bearing on the broader aspects of the instant over-all concept we feel called upon to briefly state, somewhat in passing, that the "plane of Monson," a sphere, sometimes called a Monson curve may be significantly mentioned here. We too are using the Monson 8-inch sphere philosophy insofar as such philosophy pertains to the lower posterior teeth. If in this connection the reader is so inclined reference could be made to the Monson dental articulator disclosed in Patent 1,457,385 of June 5, 1923 (now public property) and which touches briefly upon the theory that in order to illustrate certain phases of tooth formation and jaw movement and to develop the principle upon which the method is based, the drawings therein illustrate the outline of a normal human jaw with erupted teeth having their axes convergent toward a common center situated at the same radial distance, namely about 4 inches, from the occluding surfaces of the teeth as from the condyle centers, so that these occluding surfaces which coincide with the surfaces of the sphere of which the stated common point is the center. Prior art articulators, so far as we have been able to ascertain from a careful survey of the field of investigation, appear to make no mention of facebow transfer and in particular the transferring of the lower cast or the orientation of an entire instrument to an 8-inch sphere as is herein revealed and explained.

In carrying out certain underlying principles of the present invention and with reference first to the "articulator" aspect, the supporting means on which the upper cast is mounted and by way of which it is articulated is so constructed and arranged that it has an "in use" position above the lower cast and may be swung to an out-of-the-way position when it is not in use.

As will be hereinafter made apparent, the upper cast can and will be mounted so that it will articulate in centric occlusion but also can simulate lateral eccentric jaw movements when a pin is released disengaging collars embodied in the assembly.

Novelty is also predicated upon a cast positioning and setting stand on the base of the instrument which, constructed as hereinafter disclosed, permits the lower cast to be adjusted and then temporarily fixed to insure more efficient orientation relative to the base and its parts and also to the upper cast when the latter is brought into the picture.

Briefly summarized the subject matter with which we are principally concerned has to do with an instrument through the medium of which the user thereof may critically and scientifically plan, engineer and establish a best possible occlusal plane and buccal contours required for oral rehabilitation of the natural lower posterior teeth of an individual patient comprising a base plate having a calibrated scale on a marginal portion thereof which is accessible and readily usable and is adapted to accommodate a movable leg of a pair of dividers, and provided on another marginal edge with a recess providing a retaining pocket for a hooked end on a cooperating leg of the dividers, jig-like means supported atop said base plate to adjustably position and fixedly locate a lower cast in a desired position for examination and work requirement needs, facebow and bite fork position-determining and setting means embodying a horizontal arm having a free end portion located in a plane above said jig-like means and an anchored end portion detachably and adjustably supported from an end of the base plate opposite to the end on which said jig-like means is mounted, said arm having anterior posterior recesses spaced a prescribed distance apart and adapted to permit a hooked end of one leg of a pair of dividers to be operatively hung from said arm in a manner to be swept back and forth in an arcuate path relative to the arm and said means, and facebow locating and orienting means having a vertical portion adjustably mounted on a median portion of said arm and depending at right angles from the arm, and provided at a lower end thereof with a horizontal hinge-axis indicator portion disposed in a plane above a median portion of said base plate, said horizontal portion being provided at ends thereof with adjustable co-axial calibrated condyle pins to accommodate free end portions of the legs of a facebow.

Other features and advantages, including the use of an adapter for a pair of dividers for arc scribing purposes and other details, will become more readily apparent from the following description and the accompanying illustrative, but not restrictive, drawings.

In the drawings, wherein like numerals are employed to designate like parts throughout the views:

Fig. 1 is a side elevation of a special purpose instrument constructed in accordance with the underlying principles of the instant invention, and showing the upper cast mounting and supporting means swung to an out-of-the-way position, and illustrating the improved "mandibular occlusal plane establishing means" and how it is constructed and used when a facebow is correlated therewith.

Fig. 2 is a top plan view of the instrument depicted in Fig. 1.

Fig. 3 is a front elevational view, that is, a view looking at the illustration in Fig. 1 in a direction from left to right and showing the specially designed dividers in full lines.

Fig. 4 is a view with parts in section and parts in elevation with the facebow and complemental attachment means removed and showing the upper cast mounting means or assembly in place and readied for use.

Fig. 5 is a section on the horizontal line 5—5 of Fig. 1.

Fig. 6 is a fragmentary plan view of one end portion of the base showing the plate or platform at the top of the aforementioned stand with the lower cast omitted.

Fig. 7 is a detail view on the line 7—7 of Fig. 6.

Fig. 8 is a view on an enlarged scale detailing the facebow and the aligning means therefor with the adjustable condyle points.

Fig. 9 is a view enlarged and detailing the means whereby the swingable upper cast mount is latched and retained in a working or operating position.

Fig. 10 is a section on the plane of the line 10—10 of Fig. 9, looking in the direction of the arrows.

Fig. 11 is a view similar to Fig. 9 but showing the latch released and the upper disconnected and free to swivel.

Fig. 12 is a view, similar to Fig. 9, but showing a simplified construction of this aspect of the over-all invention.

Before taking up the detailed description it seems appropriate to mention that, as stated, one aspect of the inventive concept is that which pertains to a specially constructed convertible articulator. Primarily, however, the significant aspect is the means which has hereinbefore been referred to as an "attachment" and which permits the articulator to be temporarily thrown out of use and the remaining adaptations to be converted or transformed to provide an instrumentality in which one finds unique facilities.

Attention is first invited to Fig. 4. In this figure the base, which may be of any suitable size and material is denoted by the numeral 12 and this is provided at the left hand end (Fig. 2) with a readily visible and accessible 4 inch scale 14 and further provided on one marginal edge with a recess 16 serving a purpose to be later described. A standard or upright 18 is suitably attached at 20 to one end portion of the base and rises perpendicularly and is provided at a front side with a keying groove 22. In line with the standard but at the left-hand end of the base there is a small work table or stand comprising a post 24 supported in a socket or the like 26 atop the base and provided on its upper end with a horizontal flat plate 28 constituting a platform. As seen in Fig. 6 this platform is provided with several studs which are screw-threaded as at 30 and which have suitable knurled grips 32 on the underside of the platform or plate. The studs extend up through holes provided therefor in the platform where they serve to accommodate anchoring nuts 34 which serve in a manner to be described. We also provide a plurality of suitably positioned selectively usable screw-threaded holes 36, shown in Fig. 6 to accommodate insertable and removable jack screws 38. The upper ends of the jack screws are pointed as at 40 to support the bottom 42 of the lower jaw cast 44 thereon. These jack screws serve for levelling and adjusting the plane of the lower cast so that it may be properly positioned. In practice the diametrically spaced portions of the cast are luted as at 48 to the nuts and studs in a manner to be again touched upon in the following description. The base is also provided with an upstanding lug 50 which serves in a manner to be described.

We shall now refer to the assembly or support means 52 for the upper cast. This means comprises a sleeve 54 provided with a setscrew 56 and rotatably mounted on the standard 18, said sleeve also having a flange 58 at the bottom which constitutes an upper collar and which rests atop of a fixed lower collar 60 carried by the standard. The sleeve is provided with a radial stub-arm 62 which is bifurcated to permit a hinging and attaching leaf 64 to be fitted therebetween and hinged or pivoted in place as at 66. The hinge lead 64 is provided with a suitable connector 67 on which the part 68 of an anchor 70 is removably bolted in place as at 72. The anchor is embedded in the portion of the cast 46 as illustrated in Fig. 4.

With further reference to the upper cast assembly or mount 52 it will be seen that this assembly may be swung into the position for use (Fig. 4) or to an out-of-the-way position (Fig. 3) whenever necessary or desired. The in-use position where it is latched is shown in Fig. 9 and, it will be noticed that there is an L-shaped bracket or keeper 74 on the bottom of the collar 60. A latch pin 76 extends up through a bore 78 and into a keeper seat 80, said latch pin having a relatively heavy gravitating head 82 on the lower end which in turn is provided with a keeper groove 84 which is releasably engageable with the horizontal arm 86 in the manner illustrated in Fig. 11. For purposes of turning the head 82 it is provided with an outstanding crank or handle 88. Fig. 9 shows the two collars 58 and 60 latched together. In Fig. 11 the two collars 58 and 60 are releasably cooperable, allowing the collars to have relative swivel movement. The latch pin 76 drops down by gravity and may be lined up with the groove 84 engaging the stationary arm 86 in the manner illustrated. Thus the latch pin 76 is held against accidental rotation that is when it is in the position seen in Fig. 11. Actually and insofar as the essential novelty in the instant case is concerned, the latching means just detailed and described is secondary. The main thing is that the sleeve 54 with its retaining setscrew 56 may be moved so that it is either in position or in an out-of-the-way position as shown respectively in Figs. 4 and 2. When the means is in position the hinge jointing members 64 and 66 allow the mount or assembly to be lifted up and down for articulating the cast 46 relative to the cast 44. The cast 44 is placed on the jackscrews in the center of the platform plate 28. The upper cast mounting assembly is swung out of the way and the facebow frame 90 may then be brought into play. The jack screws are placed through the holes in the platform base to facilities holding the lower cast in position during the mounting. The three studs 30 and 32 are threaded through the platform or plate 28 from the bottom to engage the hexagon nuts held above the platform. The screws are placed in the center of the front surface and on each corner in back are ¼ inch from the edge. When all nuts are tightened the cast 44 is attached to the platform by pouring plaster or castone over the nuts on each corner of the platform and joining them to the cast.

Taking up now the so-called attachment means which is mounted on the upright or standard 18 and with reference again to Fig. 4, the numeral 91 designates an adapter bracket or fixture comprising a collar 92 having a setscrew 93 and an additional retaining screw 94. The collar has an outstanding arm 95 which is rigid and cylindrical in cross-section, said arm 95 being provided in its upper side with an accurately positioned outer recess 96 and an inner or posterior recess 97 (Fig. 4) visibly scribed markers or indices 98 and 99, the numeral 100 designating a groove or keyway in the bottom of the arm 95. This adapter bracket or fixture 91 serves to accommodate a readily attachable and detachable means which may be broadly constructed as a facebow positioning and translating unit embodying a horizontal hinge axis provided at ends thereof with extensible and retractible condyle points. More specifically, the means comprises an inverted T-shaped member the vertical stem of which is denoted by the numeral 102 (as seen in Fig. 3) and this is joined at the bottom 104 to a horizontal rod member which is parallel to the flat top of the base. This rod member may be also described as a facebow aligning gauge or guide 106. As seen in Fig. 8 the rod is provided in its end portions with axial sockets 108 into which the condyle pins 110 are slidingly and removably fitted. These pins are provided with suitable graduations 112 and at their outer ends with condyle points or heads 114 for the cooperating free end portions 116 on the legs 117. These legs are connected with suitable clamps or clips 118 on the frame member 120 in the manner shown. This component is a more or less conventional type facebow with adjustable legs and with the free end portions 116 of the legs cooperable (for registration, planning, engineering needs and guidance) with the condyle points 114.

When the T-shaped member is not in use the attaching collar 122 on the upper end thereof may be stored and held in an out-of-the-way position on the aforementioned lug 50 as shown in dotted lines in Figs. 3 and 4. It is yet to be added that the collar 122 is provided with a setscrew 126 used in the manner seen for example in Figs. 1 and 3. The numeral 128 (Fig. 3) designates a pair of dividers the legs of which are denoted at 130 and 131. The lower end of the leg 131 serves for scribing an arc and the inturned pivoting and retaining hook or beak 132 on the of the upper leg provides for pivotally suspending said upper leg 130 from the arm 95 in the manner clearly shown in Fig. 3. There is a definite distance, ¾ of an inch, between the two markers 98 and 99, as seen in Fig. 4. Also, there is a corresponding distance between the selectively usable anchoring and fulcruming recesses 96 and 97 for the hooked end 132 of the divider leg 130. The "drop" of the vertical portion of the inverted T is 3 inches as indicated in Fig. 1. These measurements tie in with the aforementioned 4 inch scale 14 on the left-hand end of the base (Fig. 2). The recess 16 serves to accommodate the hook or bill 132 when one desires to hook the leg 130 on the base and adjust the other leg 131 in reference to the intended or desired graduations of the scale 14.

The improved instrument, particularly the added facebow accommodating equipment is efficaciously and reliably used to establish the functional occlusal plane of the mandibular posterior teeth first on the experimental or study casts and secondly on the working casts on which are fabricated castings which are to be submitted on the lower teeth of the patient.

These casts are adjusted to their proper position by the four pointed jackscrews 38 threaded through the bottom of the platform plate 28 and extending above said platform plate. By selecting a combination of four holes which will center on the four corners of the cast, the cast may be easily adjusted up or down in any position by raising or lowering the jackscrews. Any suitable arrangement of holes 36 for the jackscrews 38 is provided so that any positional group and relationship of jackscrews may be used. These jackscrews will also hold the cast in correct position until it is luted to attachment nuts 34 on the platform base solidly with plaster 48.

The dividers are standard 8 inch dividers and they are modified, that is, one end is heated and the tip is bent at a 90° angle to facilitate engaging the divider seats in the aforementioned arm 95, that is the seats 96 and 97. In addition the legs are shortened to 1 inch and the straight end modified to provide cutting edges parallel to the occlusal plane when the hooked end is seated in the provided recess or seat on top of the horizontal rod, 96 and 97 and the dividers adjusted to 4 inches between the ends. The bent end is seated in the divider seat on the horizontal arm 95 and the straight end of the leg 131 is swept in an arc from the cuspid back to establish the functional occlusal plane of the finished lower oral rehabilitation and to modify the lower study cast to obtain transfer copings. These facts will enable the dentist to accurately determine exactly how much tooth structure to remove in the cavity preparation procedure so that all of the occlusal surfaces of the restored lower posterior teeth should conform to the established functional plane.

The small lightweight easily adjusted facebow 90 is an essential part of the over-all instrument and is used to accurately mount the lower cast on the plate 28. This is accomplished by taking a wax index of both upper and lower teeth of the patient with his jaws in the terminal hinge position. The ends of the facebow are then adjusted to a point on the face 12 millimeters anterior to the tragus of the ear on a line from the tragus to the ala of the nose (Camper's line). This facebow registration is used to mount the lower cast on the instrument by fitting said casts into the imprints made by the lower teeth in the wax index and seating the cast on the jackscrews of the paltform or plate 28 so the ends of the facebow arms approximate the ends of the aligning and orienting guide 106 when the divider arc conforms to the desired functional occlusal plane of all lower teeth posteriorly from the cuspid.

The upper cast mounting assembly allows the upper cast to be mounted with teeth in centric occlusion. This assembly allows the cast to be raised or lowered by an adjustable elbow or clamp member. Or, the entire assembly can be swung laterally on the upright rod to get it out of the way just in case the facebow frame or dividers needs to be used. A lower collar which is locked into position enables this assembly to be swung back into position and again locked in its original position, so that the upper cast may be opened and closed in occlusion with the lower. In addition, when the locking mechanism is disengaged, the collars slide smoothly on each other so that lateral jaw movement of the cast can be simulated. These interlocking collars are unique in that the lower collar is keyed to the keyway on the front of the upright rod whereas the upper can swing freely. The only connection between the two is the locking pin which returns the entire assembly to a fixed position with the upper cast in centric position.

It is within the purview of the concept to employ a construction and arrangement of components much simpler than that shown in Figs. 9, 10 and 11. To this end and so that the reader will fully appreciate the significance of this aspect of the matter, attention is directed to the modification seen in Fig. 12. Here the sleeve of the upright 18, being similar to sleeve 54, is denoted by the numeral 53 and is provided on one side with a setscrew 55 which may be screwed firmly against the upright in an obvious manner. The flange 57 at the bottom of the sleeve constitutes an upper collar and rests atop a fixed lower collar 59, said collar being suitably secured to the upright in the position shown. The sleeve is provided with a radial arm 61 which is bifurcated to permit the cooperating hinging and attaching member 63 to be pivotally connected therewith as at 65. The numeral 69 designates a binding screw which serves to clampingly bind the furcations against part 63 to assist in interconnecting these parts. In this construction the comparatively complicated latch pin 76, L-shaped member 86 and other cooperating parts depicted in Figs. 9, 10 and 11 are omitted. The flange or collar 57 simply rests with its bottom flat surface on the bottom top surface of the collar 59 so that when the sleeve 53 is unlocked it may turn freely to position the upper cast assembly either in an out-of-the-way position or a centered ready-to-function position as brought out for example in Figs. 2 and 4 respectively. All that is necessary in this simplified construction is to provide a groove or keyway 71 to accommodate the shank of the selectively usable setscrew 73.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An instrument through the medium of which the user may establish the best possible mandibular functional occlusal plane on lower posterior teeth in each individual case comprising a base, a standard attached to and rising perpendicularly from said base, a lower cast supporting and problem evaluating stand mounted atop said base, said stand embodying a post attached to said base and a plate atop the post, means on said plate for adjustably supporting and detachably anchoring a lower cast on said plate, a multipurpose attachment mounted on said standard comprising an adapter having selectively usable anterior and posterior keeper seats for a hooked end on one leg of a pair of dividers, facebow positioning and translating means suspended and depending from said adapter, said means including a horizontally disposed guide and reckoning member indicative of and representing a predetermined horizontal hinge axis, said member being provided at its respective ends with extensible and retractable condyle points, a facebow having a frame member provided at ends thereof with adjustable legs, said legs having free end portions which are adjustably cooperable with said condyle points, attaching and suspending means for an upper cast characterized by a sleeve rotatably mounted on said standard, and additional means on said standard whereby said sleeve may be latched thereto or unlatched therefrom and permitted to swivel.

2. A portable instrument through the medium of which the user can plan and establish the functional occlusal plane and buccal contours needed in restoring, reconstructing and rehabilitating the natural lower posterior teeth of a given patient comprising a base provided with a vertical standard and also with an upstanding problem evaluating stand for receptive support of study and working casts, said stand embodying a post secured to and rising vertically from said base and provided at its top with a plate having selectively usable screw-threaded holes to receive lower cast adjusting and levelling jackscrews, said plate being further provided at predetermined marginal portions with removable nut-equipped anchoring studs permitting predetermined portions of said lower cast to be luted into position after it has been adjusted to the desired position on said plate, a collar fixed on said standard, a sleeve slidably keyed on said standard and having a flange at the bottom thereof providing a second collar, said collars being superposed one on the other, one collar being provided with a releasable latch engageable with a keeper provided therefor in the other collar, said sleeve being provided with a bifurcated portion having a hinged coupling member thereon and said coupling member carrying an anchor for supporting retention of a complemental part of an upper cast, and an adapter bracket above said sleeve having a collar keyed on the standard and provided with an outstanding arm overhanging the base and plate on said stand, said arm being provided with longitudinally spaced selectively usable keeper seats for a hooked end portion on one leg of a pair of dividers, a collar removably mounted on said arm, and a T-shaped member attached to and depending from said collar, said T-shaped member having a vertical portion and a horizontal portion, said horizontal portion being provided with axial sockets at the ends thereof, and condyle pins suitably graduated and removably and adjustably mounted in the respective sockets.

3. An instrument through the medium of which the user may establish the best possible mandibular functional occlusal plane on lower posterior teeth in each individual case comprising a base, a standard attached to and rising perpendicularly from said base, a lower cast supporting and problem evaluating stand mounted atop said base, said stand embodying a post attached to said base and a plate atop the post, means on said plate for adjustably supporting and detachably anchoring a lower cast on said plate, a multipurpose attachment mounted on said standard comprising an adapter having selectively usable anterior and posterior keeper seats for a hooked end on one leg of a pair of dividers, facebow positioning and translating means suspended and depending from said adapter, said means including a horizontal hinge axis, said member being provided at its respective ends with extensible and retractable condyle pointers, a facebow having a frame member provided at ends thereof with adjustable legs, said legs having free end portions which are adjustably cooperable with said condyle pointers.

4. A portable instrument through the medium of which the user can plan, engineer and establish the most ideal functional occlusal plane and buccal contours needed for oral rehabilitation of the natural lower posterior teeth of a given patient comprising a portable base provided with a standard, a problem evaluating stand fixedly mounted atop said base for study and working casts, said stand being related to, spaced a prerequisite distance from, and alined and cooperating with said standard and embodying a relatively short post fixed to and rising vertically from said base, said post being provided at its top with a horizontal plate approximately paralleling the top of said base, said plate being provided with a plurality of cast suspending and levelling jackscrews arranged thereon within perimeter limits of the plate and selectively positionable and adjustable to locate the cast in a predetermined problem-studying and evaluating position, said plate being further provided on marginal corner portions thereof with manually regulatable adjusting studs extending above the plate and equipped with nuts serving to permit portions of a lower cast to be securely luted and anchored in the desired position atop said plate, and an adapter bracket removably and adjustably mounted on said standard and provided with an outstanding arm overhanging the base and the plate, said arm being provided with longitudinally spaced selectively usable keeper seats for a hooked end portion on one leg of a pair of dividers, a manually shiftable collar slidingly and removably mounted on said arm, and an inverted T-shaped member attached to and depending from said collar, said T-shaped member being adapted to permit a facebow to cooperate therewith, having a vertical portion and a horizontal portion, said horizontal portion being in a plane above the plate and provided with axial sockets at the ends thereof, and suitably graduated condyle pins removably and adjustably mounted in the respective sockets.

5. A portable instrument through the medium of which a user thereof may plan and establish the functional occlusal plane and buccal contours required for oral rehabilitation of the natural lower posterior teeth of a given patient comprising a portable base provided with a vertical standard and a problem-evaluating stand for study and working cast, said stand embodying a plate attached to and spaced above and generally parallel with the top of said base, said plate having selectively usable screw-threaded holes, jackscrews screwed into predetermined ones of said screw-threaded holes with upper pointed end portions projecting above the plate for cast suspending, levelling and adjustment needs, means on corner portions of said plate adapted to permit corresponding corner portions of a part of said cast to be securely anchored on the plate in a planning and engineering position, an inverted T-shaped member, and means mounted on said standard for removably and adjustably suspending said T-shaped member in a vertical position from said standard, said T-shaped member having a vertical stem portion adjustable on said means and a horizontal portion, said horizontal portion being in a plane above said base and plate and generally in a position at right angles to the standard and above a space intervening between the standard and an adjacent marginal portion of said plate, said horizontal portion having manually regulatable means at the respective outer ends thereof to accommodate and permit orientation to the free ends of the legs of a facebow therewith.

6. The structure defined in claim 5, and wherein the end portions of said horizontal portion are provided with axial sockets, said means comprising condyle pins graduated and removably and adjustably mounted in their respective sockets.

7. The structure defined in claim 5, and wherein said T-shaped member is provided at the upper end of the vertical stem portion with a collar and a fastening screw therefor, said base being provided with an upstanding stud on which said collar may be mounted when said T-shaped member is stored in an out-of-the-way position on said base, said T-shaped member and collar constituting a single structural unit, the vertical and horizontal portions of said T-shaped member being of restricted cross-section and said cross-section being circular.

8. An instrument through the medium of which a user therof may plan, engineer and establish the functional occlusal plane and buccal contours required for oral rehabilitation of the natural lower posterior teeth of an individual patient comprising a base provided at one end with a vertical standard, provided at the other end with a table-like stand adapted to support study and working casts for problem-evaluating purposes, said stand embodying a plate having selectively usable screw-threaded holes, jackscrews screwed in said holes, the upper end of said screws projecting above the plate for adjusting and levelling a cast resting thereon, said plate being further provided at predetermined marginal portions with anchoring studs adapted to permit predetermined portions of said cast to be securely anchored on said plate, an adapter bracket removably and adjustably keyed on the upper portion of said standard and having a horizontal outstanding arm overhanging the base and plate, said arm being provided on an upper side thereof with precisely spaced selectively usable anterior and posterior keeper seats for temporary retention of a hooked end portion on one leg of a pair of dividers, a median portion of said arm having critically calibrated marker lines thereon located between the posterior keeper seat and said standard, an inverted T-shaped member embodying a vertical portion and a horizontal portion, said vertical portion paralleling the upper part of the standard in spaced parallelism and being provided at its upper end with means whereby it is removably mounted on the median portion of said arm and may be adjusted relative to the keeper seats and marker lines, said horizontal portion being disposed in a plane above the said plate and being provided at its respective outer ends with graduated condyle pins.

9. The structure defined in claim 8, and in combination a facebow embodying a frame provided at ends thereof with lateral adjustable legs, said legs having free end portions adapted to be oriented with said condyle pins but having no positive mechanical connection with said pins whereby said facebow may be manipulated manually and freely in a plane well above the plane of said plate.

10. The structure defined in claim 9, and in combination, a pair of dividers having hingedly connected legs, the free end of one leg having a hooked end portion providing a keeper for selective reception in one of the aforementioned keeper seats, the free end of the other leg being constructed for scribing purposes, and said hooked end providing a fulcrum permitting the dividers to be bodily swung toward and from the standard in a manner to cause the lower leg to sweep through a given arc.

11. The structure defined in claim 9, and wherein a marginal edge portion of the base is provided with a recess to accommodate said hooked end, and an adjacent marginal edge is provided with a calibrated scale, whereby the legs of said dividers may be associated with said scale in carrying out certain steps in the over-all rehabilitation procedure.

12. A portable instrument through the medium of which the user thereof may critically and scientifically plan, engineer and establish a best possible functional occlusal plane and buccal contours required for oral rehabilitation of the natural lower posterior teeth of an individual patient comprising a base plate having a calibrated scale on a marginal portion thereof which is accessible and readily usable and is adapted to accommodate a movable leg of a pair of dividers, and provided on another marginal edge with a recess providing a retaining pocket for hooked end on a cooperating leg of the dividers, jig-like means supported atop said base plate to adjustably position and fixedly locate a lower cast in a desired position for examination and work requirement needs, facebow and bite fork position-determining and setting means embodying a horizontal arm having a free end portion located in a plane above said jig-like means and an anchored end portion detachably and adjustably supported from an end of the base plate opposite to the end on which said jig-like means is mounted, said arm having anterior and posterior recesses spaced a prescribed distance apart and adapted to permit a hooked end of one leg of a pair of dividers to be operatively hung in a manner to be swept back and forth in an arcuate path relative to the arm and said means, and facebow locating and orienting means having a vertical portion adjustably mounted on a median portion of said arm and depending at right angles from the arm, and provided at a lower end thereof with a horizontal hinge-axis indicator portion disposed in a plane above a median portion of said base plate, said horizontal portion being provided at ends thereof with adjustable co-axial calibrated condyle pins to accommodate free end portions of the legs of a facebow.

References Cited in the file of this patent

UNITED STATES PATENTS

| | | |
|---|---|---|
| 989,540 | Sweet | Apr. 11, 1911 |
| 1,457,385 | Monson | June 5, 1923 |
| 1,468,731 | Bird | Sept. 25, 1923 |
| 1,670,311 | Musante | May 22, 1928 |
| 1,736,006 | Hagman | Nov. 19, 1929 |
| 2,334,643 | Moore | Nov. 16, 1943 |
| 2,621,407 | Schlesinger | Dec. 16, 1952 |

FOREIGN PATENTS

| | | |
|---|---|---|
| 394,568 | Great Britain | June 29, 1933 |